(12) United States Patent
Dutton et al.

(10) Patent No.: US 6,934,217 B2
(45) Date of Patent: Aug. 23, 2005

(54) COUNTERMEASURE THREAT EMULATOR AND METHOD

(75) Inventors: C. Ray Dutton, New Bedford, MA (US); Lynn A. Potter, North Kingstown, RI (US); Joseph B. Lopes, Seekonk, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 919 days.

(21) Appl. No.: 09/780,367

(22) Filed: Feb. 13, 2001

(65) Prior Publication Data

US 2004/0228213 A1 Nov. 18, 2004

(51) Int. Cl.[7] ................................................ H04K 3/00
(52) U.S. Cl. ......................................................... 367/1
(58) Field of Search ........................... 367/1; 114/21.3; 434/6, 10

(56) References Cited

U.S. PATENT DOCUMENTS 4,192,245 A * 3/1980 Kendig et al. ................. 114/23
5,235,924 A * 8/1993 Slaton et al. .............. 114/21.3
6,341,101 B1 * 1/2002 Dutton et al. ................... 367/1

OTHER PUBLICATIONS

MacPherson, David., "Mk48 ADCAP Torpedo High–Assurance Testing," High Assurance Systems Engineering Workshop, Proceedings., IEEE, Oct. 1996, Niagara on the Lake, Ontario, Canada.*

* cited by examiner

Primary Examiner—Ian J. Lobo
(74) Attorney, Agent, or Firm—James M. Kasischke; Jean-Paul A. Nasser; Michael P. Stanley

(57) ABSTRACT

A system and method is disclosed for a countermeasure threat emulator (CME) provided in a tubular housing that may be launched from a submarine or ship. The CME electronics include a CPU board for running software, communicating with a computer external to the housing and data recording. The external computer preferably incorporates a database having data representative of a plurality of both foreign and domestic countermeasures. The data may be downloaded to the CPU board as well as updated for reprogramming of the CPU board. A digital signal processing board utilizes a plurality of DSP processors for running software capable of producing a wide range of acoustic signal outputs. A neural network may be used for analyzing and identifying acoustic sounds from incoming threats and notifying the CPU board for selection of a preprogrammed response for transmission by a transducer stack.

15 Claims, 1 Drawing Sheet

COUNTERMEASURE THREAT EMULATOR AND METHOD

STATEMENT OF THE GOVERNMENT INTEREST

The invention described herein may be manufactured and used by or for the Government of the United States of America for Governmental purposes without the payment of any royalties thereon or therefore.

BACKGROUND OF THE INVENTION (1) Field of the Invention

The present invention relates generally to torpedo countermeasure devices and, more specifically, to programmable apparatus and methods for emulating torpedo countermeasure devices.

(2) Description of the Prior Art

Torpedo countermeasure (CM) devices are used on ships and submarines to confuse incoming torpedos. Therefore, a need exists for testing U.S. torpedoes with respect to foreign countermeasures to determine the efficacy of U.S. torpedoes when confronted by countermeasures. The current methodology of testing U.S. torpedoes is to use a U.S. countermeasure device that is thought to be representative of a possible foreign CM device, and use this U.S. countermeasure in field tests. However, because prior art U.S. countermeasures may not be the same as various foreign countermeasures, are highly limited in the type of response which may be produced especially with respect to the requirements of emulating foreign countermeasures, and do not have related desirable features for this purpose as discussed below, the testing may not be as complete as may be desired.

The prior art discloses various types of training required by submarines and the development of various types of acoustic devices, but does not provide a solution to the above disclosed problem and does not even appear to recognize this long felt need. Representative patents in this area include the following:

U.S. Pat. No. 2,887,671, issued May 19, 1959, to Burton Frankel et al., discloses an invention pertaining to a sonar device used in the training of sonar operators to acquaint them with the characteristic sounds of a sonar ping returning from a submarine. Claim 1 states: In a sonar device, an elongated hull to be placed underwater and having a forward and an aft transducer for receiving a sonar ping, comparing means mounted in the hull for comparing the time relationship of arrival of a given ping as received by the forward and aft transducers, means connecting the forward and aft transducers to the comparing means, signal generating means connected to the comparing means for generating a signal having a characteristic which is a function of the relationship, and transmitting transducer means mounted on the elongated hull and connected to the signal generating means for transmitting the generated signal.

U.S. Pat. No. 5,394,376, issued Feb. 28, 1995, to Laurence R. Riddle et al, discloses an apparatus for reducing acoustic radiation from an enclosure containing a fluid including one or more vibration sensors in communication with surfaces of the enclosure. The vibration sensors feed signals corresponding to detected vibrations in the surface to a radiation filter. The radiation filter assigns weights to the signals and generates a summation signal which is then input to a control unit, with the summation signal ideally representing only those vibrations that will actually radiate from the enclosure. The control unit uses a reference signal and the summation signal to calculate a cancellation waveform to offset the cause of the detected vibrations. The cancellation signal is input to a fluid displacement unit which applies pressure oscillations to the fluid corresponding to the cancellation waveform.

U.S. Pat. No. 4,184,209, issued Jan. 15, 1980, to Ralph P. Crist, discloses a towed decoy system adapted to be towed from a towing vessel, an electrically powered noisemaker, an electrical tow cable attached to the noisemaker, a depressor vane, a depressor cable connected to the depressor vane and to the towing vessel, and means interconnecting the depressor cable and the electrical tow cable at a point near the depressor vane, the interconnecting means comprising a pair of cable grips respectively attached at one end to adjacent sections of the electrical tow cable and at their other ends to a snatch block movably mounted on the depressor cable thereby providing slack in the electrical tow cable, whereby the noisemaker is towed at a depth not less than that of the point of attachment of the snatch block to the depressor cable.

U.S. Pat. No. 4,025,724, issued May 24, 1977, to Allen R. Davidson, Jr. et al., discloses an array of independent sound cancellation units arranged over a vibrating noise generating surface. Each unit includes an arrangement of acoustic transducers (sensors) positioned adjacent the surface to obtain an electrical average of the local acoustic noise generated by a predetermined zone of the surface. The summed average is changed in phase and gain by an active filter whose output drives an acoustic projector also positioned adjacent the surface and the acoustic output of which sums with the original noise signal in the acoustic far field, thus tending to cancel the noise. In essence, each vibrating surface zone and its associated sound cancellation unit tends to form an acoustic doublet. A signal indicative of the projector output is used as a feedback signal, with appropriate time delays, to cancel the effect of the projected output signal being picked up by the unit's transducers, and to cancel the effect of the output of other projectors of the array.

U.S. Pat. No. 5,033,028, issued Jul. 16, 1991, to Douglas R. Browning, discloses and describes an apparatus and method for overcoming stroke limitations of moving coil reaction-mass vibration dampers, by recovering armature stroke displacement. The coil housing is selectively coupled or de-coupled to the vibrating structure. If, when the armature reaches its travel limit, sufficient damping energy has not been applied to the structure, the coil-housing assembly is decoupled from the structure while the armature is pulsed back to its zero displacement position. The housing then is re-coupled to the surface, having displaced some determinable distance from its previous location relative to the surface. Additional armature movement in the same direction as the previous armature stroke is applied, thereby generating the needed additional damping force. The resetting of the housing to its normal position vis-a-vis the vibrating structure can occur at a selected time in the damping force-generating cycle when reset does not impart an undesired reaction to the vibrating structure. In one implementation, a pair of moving-coil actuators counter-drive the vibrating structure; in another, a multiplicity of additional reaction-mass actuators are used.

U.S. Pat. No. 5,341,343, issued Aug. 23, 1994, to Robert L. Aske, discloses an explosive actuated acoustic device which emits sound to be used in torpedo countermeasures. Numbered devices are delivered over an extended area and sink through the water. The devices are actuated at different times as they sink, to provide sound masking over an extended period of time. The devices also include safety devices which prevent premature actuation from jarring or jolting and from impact with the water.

U.S. Pat. No. 5,117,401, issued May 26, 1992, to Paul L. Feintuch, discloses an active adaptive noise canceller that inserts delays in the weight update logic of an adaptive filter employed by the canceller to make the filter stable. It has been found that there is a great deal of flexibility regarding the selection of the delay values. This insensitivity permits designing the delays in advance and not having to adjust them to different situations as they change, thus no longer requiring a training mode. The canceller dramatically reduces the amount of hardware needed to perform active adaptive noise cancelling, and eliminates the need for the training mode, which in some applications, including automobiles, for example, can be objectionable as the noise sources that are to be suppressed.

The above patents do not address or provide solutions to the problem of testing torpedoes with respect to various types of countermeasures. Consequently, it would be desirable to provide an in-water device that can emulate known characteristics of CM devices, both U.S. and foreign. It would be desirable for such a device to be reusable, either stationary or mobile, and suitable for both in-laboratory and in-water use. Moreover, it would be desirable to provide a system that is totally programmable and can be programmed to intercept and identify a threat waveform, and then respond in a totally programmable manner, including preprogrammed structured signals, broad band noise, narrow band noise, echo repeater mode, swept LFM mode, or any one of several possible randomly generated false alarm modes where the transmission is a modified replica of the intercepted threat waveform. Those skilled in the art will appreciate the present invention that addresses the above and other needs and problems.

SUMMARY OF THE INVENTION

Accordingly, it is an object of the present invention to provide a countermeasure threat emulator.

It is yet another object of the present invention to provide a means for testing domestic torpedoes against foreign countermeasures.

These and other objects, features, and advantages of the present invention will become apparent from the drawings, the descriptions given herein, and the appended claims.

In accordance with the present invention, a method is provided for testing a torpedo utilizing a countermeasure threat emulation system which comprises steps such as selectively programming the countermeasure threat emulation system for producing at least one of a plurality of foreign countermeasures chosen from a database of foreign countermeasures. The countermeasure threat emulation system is controlled to operate at a selected depth or range of depths in the water. The countermeasure threat emulation system may be stationary or mobile. A torpedo is launched for testing with the countermeasure threat emulation system.

The sounds produced by the torpedo may be analyzed with a neural network within the countermeasure threat emulation system. The analysis by the neural network results in an identification of the torpedo. A CPU within the countermeasure threat emulation system may be programmed to respond to the torpedo based on the identification so derived.

The countermeasure threat emulation system may preferably operate in duplex mode by simultaneously sending and receiving acoustic signals. A digital signal processing unit within the countermeasure threat emulation system may be used for selectively producing a large number of different types of signals including a wideband acoustic signal or a band limited acoustic signal.

The programmable countermeasure threat emulation system comprises a tubular housing suitable for launching from a submarine and a power supply within the tubular housing. The power supply includes controls for selectively operating remotely or operating connected to an external power source. A hovering system for the tubular housing is provided for controlling a water depth of the tubular housing. A transmitter which may be comprised of a transducer stack may be used for transmitting acoustic signals. A digital signal processing unit produces waveforms to be transmitted by the transmitter. A central processing unit is used for storing digital information related to one or more countermeasure threats and supplying the digital information to the digital signal processing unit. The system also comprises a database stored in a computer external to the housing which contains a plurality of foreign countermeasure threats. A plurality of field programmable gate arrays is preferably provided for the digital signal processing unit so as to make this unit programmable. A signal conditioner is operable for converting a stream of digital signals into an analog signal for broadcast by the transmitter.

In operation, the method comprises maintaining a database having a plurality of foreign countermeasure threats. Data for at least one of the plurality of foreign countermeasure threats is downloaded into a computer within the countermeasure threat emulator. The countermeasure threat emulator is launched for underwater operation. An emulation of the respective foreign countermeasure threat is transmitted into water through an acoustic transducer. A receiver hydrophone is utilized in the countermeasure threat emulator for receiving acoustic signals produced by an incoming torpedo. The incoming torpedo is identified from the received acoustic signals by utilizing a neural network within the countermeasure threat emulator and responding to the incoming threat based on the identification and a preprogrammed response for the identification.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein.

BRIEF DESCRIPTION OF THE PREFERRED EMBODIMENTS

Figure 1:
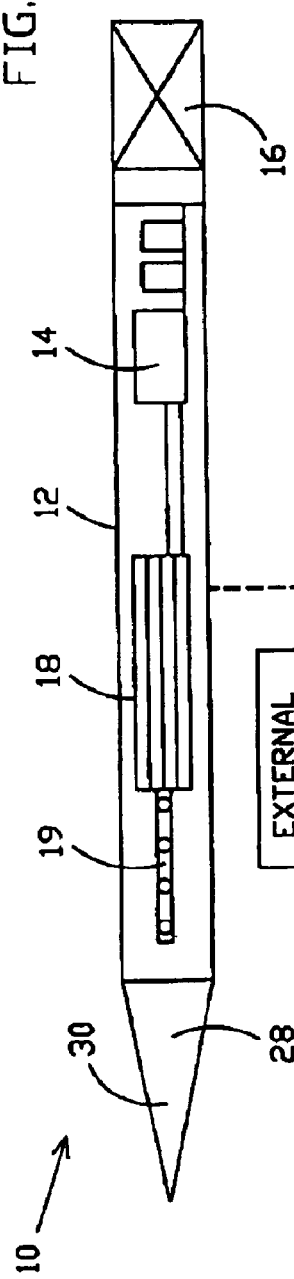
FIG. 1 is a schematic representation of a countermeasure unit in accord with the present invention.
Figure 2:
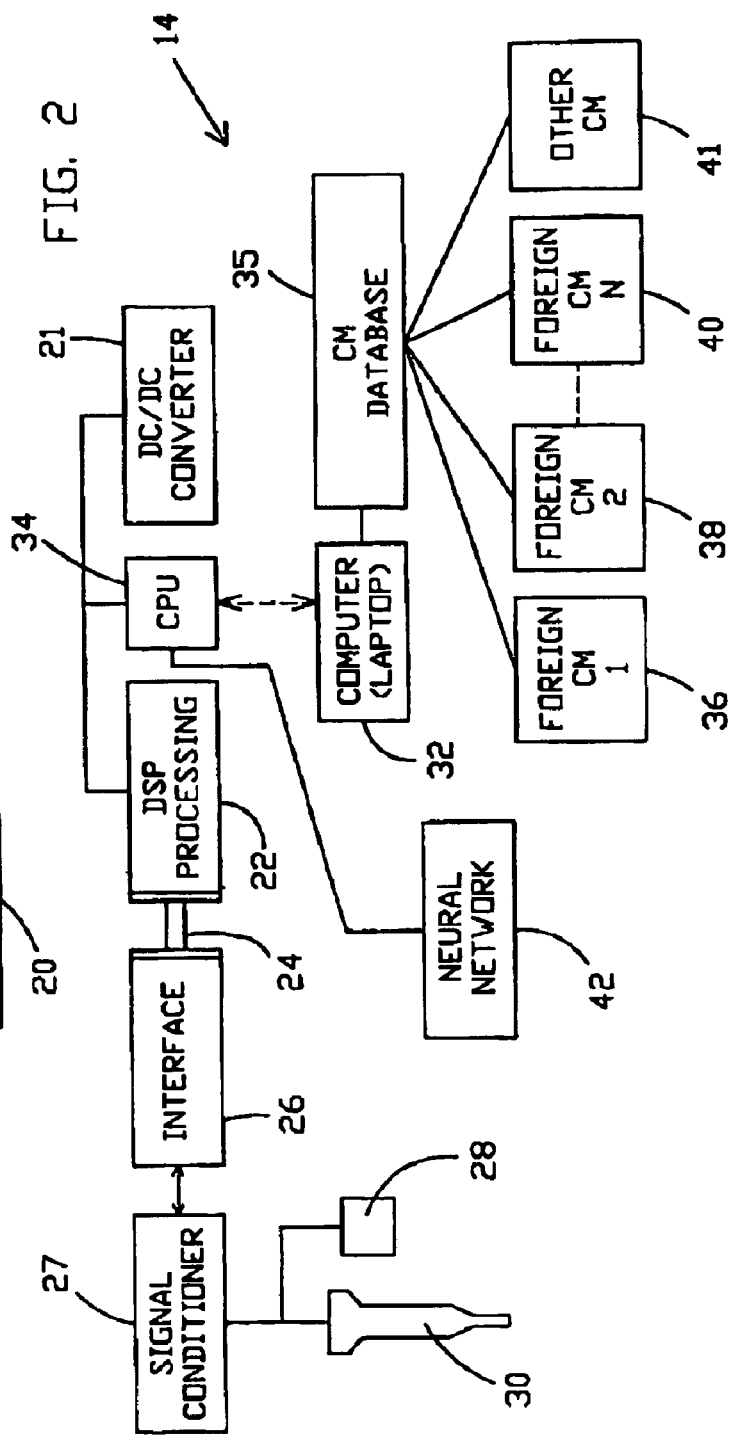
FIG. 2 is a schematic block diagram of countermeasure electronics for the countermeasure unit of FIG. 1.

Referring now to the drawings and, more particularly, to FIG. 1 there is shown a countermeasure threat emulator 10 in accord with the present invention. CM threat emulator 10 may be provided within a six inch CM housing or other size housing 12 so as to preferably be launchable/retrievable from a torpedo tube. CM threat emulator 10 includes countermeasure electronics unit 14 discussed hereinafter and shown in block diagram form in FIG. 2. CM threat emulator 10 is provided with hovering system 16 for controlling water depth, which may also be used in making CM threat emulator 10 mobile. While CM threat emulator 10 is preferably reuseable, one embodiment of CM threat emulator 10 may be made low enough in cost so as to be expendable by using, for instance, mostly salvaged components of existing countermeasure devices. For remote operation, power source 18 may be used although when tethered to surface controls, CM threat emulator 10 can be operated using external power from external control 20. Power control electronics 19 can be provided to perform such functions as switching between power supply sources, recharging, and the like. Power supply 18 and/or power from external control 20 may be used to provide power to DC/DC converter 21 (see FIG. 2) for powering CM electronic unit 14.

Preferably, CM electronic unit 14 utilizes commercial off the shelf technology wherever possible. CM emulator electronics 14 may include up to four digital signal processors (DSP) 22, such as the Texas Instruments TMS320C40. In a preferred embodiment, the main software runs on four DSP processors. DSP processing unit 22 is interconnected with transducer interface 26 by high speed bus 24. Interface 26 preferably includes at least four analog channels in and four analog channels out. As well, interface 26 preferably includes at least sixteen channels of high speed digital input/output (TTL) for cooperation with high speed bus 24 and for use by signal conditioner and power amplifier 27. The analog channels may also be used in conjunction with signal conditioner and power amplifier 27. Signal conditioner/power amplifier 27 may be used to convert digital streams of TTL signals to analog sinusoidal waves for use by a transducer stack such as transducer stack 30. Signal conditioner 27 therefore connects to one of several possible transducer stacks, or transmitters 30, such as an ADC MK2 array, an ADC MK3 array, or a BQR-7 spherical array.

Signal conditioner 27 also preferably connects to a receive hydrophone 28. Receive hydrophone 28 will serve to collect in-water data of incoming torpedo threats from the view-point of the countermeasure hydrophones. The data so collected and stored by CPU 34 will be used to enhance simulation and modeling efforts, and then verify the mathematics used in development of the other countermeasure techniques. Thus, the memory of CPU 34 may be downloaded into computer 32 for such analysis.

Electronics unit 14 including CPU 34 are totally programmable and can be programmed by external computer 32, such as a weapons control panel or laptop computer, to intercept and identify a threat waveform by means discussed hereinafter, and then respond in a totally programmable manner, including pre-programmed structured signals, broad band noise, narrow band noise, echo repeater mode, swept LFM mode, or any one of several possible randomly generated false alarm modes (where the transmission is a modified replica of the intercepted threat waveform).

In order for CM threat emulator 10 to be programmable, CM electronics unit 14 is therefore designed to be programmable. CM electronics unit 14 may be programmed to respond in any arbitrary fashion or with specific characteristics. CM electronics unit 14 can be programmed via an alterable and updateable database 35 to emulate a plurality of foreign CM waveforms and signal types as indicated by 36, 38, and 40. CM threat emulator 10 may also be used to imitate other countermeasure devices 41 such as various existing domestic countermeasure devices. The device requirements for the CM database 35 come from the MK2, MK3, and MK4 system specification documents, from available foreign documents, and from efforts to develop operating characteristics of rest of the world CM devices, and the like. Thus, the information for CM database 35 has been obtained, will be updated in the future, and is preferably maintained in one form as downloadable CM database 35 for use by CPU 34.

As indicated above, CM threat emulator 10 can be made to emulate mobile threat countermeasures as well as stationary ones.

Preferably, CM threat emulator 10 can operate in full duplex mode, receiving transmissions from receive hydrophone 28 while broadcasting from transmitters 30. Depending on the selection of type of countermeasure to be emulated, CM threat emulator 10 can be programmed to operate in either a wideband or band limited manner.

The processors provided in DSP processing unit 22 are preferably in a format that can be used to permit a wide array of different types of signals to be processed. Preferably, neural network 42, such as a Ni-1000 Recognition Accelerator Chip from Nestor and Intel is provided for pattern recognition of incoming threats so as to identify the particular threat. Neural network based processor 42 will be used for incorporation of research into classification of incoming torpedoes based on pattern recognition of acoustic signatures processed with advanced time frequency distribution and wavelet algorithms.

DSP processing unit 22 preferably includes field programmable gate arrays (FPGA) and flash memories for at least two purposes. One use will be in digital "glue logic" functions for consolidation of space and functional enhancement. Secondly, the FPGA's and flash memories may be used to provide reconfigurable DSP logic. FPGA technology can be used for construction of high speed digital signal processing logic. Additionally, the FPGA's are dynamically programmable, so the DSP processing elements can be re configured based on changing tactical information (for example, the FPGA's could be designed as a tunable digital filter, or as an iterative bank of filters), or can possibly be reprogrammed by an advanced CM shipboard launcher designed to use such flexibility.

The programmability of CM threat emulator 10 makes the system virtual, giving the CM threat emulator 10 the ability to emulate any CM device under software control. The bulk of the processing and control software preferably running under the Texas Instrument's TMS320C40 digital signal processing chips may be developed using the Pegasus Parallel Processing Design Environment developed by Jovian Systems, Inc. The parallel C40 digital signal processor software development system may be used to auto-generate C code suitable for use on a network of multiple interconnect C40 modules using a graphical icon based environment. The final product is multi-threaded and multi-tasking executable code that can be easily distributed over the multiple modules via the C40's high speed communication ports.

In summary, a relatively low cost CM threat emulator 10 may serve as a test platform for in-water testing of new concepts and technology for next generation CM device development and as a low cost test vehicle for U.S. Torpedo Programs requiring foreign CM device acoustic signatures. The present invention takes advantage of presently available information about foreign and domestic torpedo countermeasure devices to provide the technology for providing a virtual countermeasure concept. CM threat emulator 10 is suitable for in-water use, where it will be designed to be deployed from both submarine and ship platforms, serving a dual role as a developmental platform for testing new concepts and technology. CM threat emulator 10 also acts as a low cost test vehicle for U.S. Torpedo Programs requiring foreign CM device acoustical signatures for high fidelity testing of U.S. Torpedoes.

Numerous variations of the above method are possible, some of which have already been described. Therefore, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A programmable countermeasure threat emulation system, comprising:
   a tubular housing suitable for launching from a submarine;
   power supply within said tubular housing, said power supply including controls for selecting between operating remotely and operating connected to an external power source;
   hovering system for said tubular housing for controlling mobility of said tubular housing within water;
   transmitter for transmitting acoustic signals;
   digital signal processing unit for producing waveforms to be transmitted by said transmitter; and
   a central processing unit for storing digital information related to one or more countermeasure threats and supplying said digital information to said digital signal processing unit.

2. The system of claim 1 further comprising a receiver hydrophone.

3. The system of claim 2 further comprising a neural network analyzing signals from said receiver hydrophone.

4. The system of claim 1 further comprising a plurality of field programmable gate arrays for said digital signal processing unit.

5. The system of claim 1 further comprising a plurality of digital signal processing integrated circuits for said digital signal processing unit.

6. The system of claim 5 further comprising a signal conditioner operable for converting a stream of digital signals into analog signal for broadcast by said transmitter.

7. The system of claim 1 further comprising a database stored in a computer external to said housing, said database containing a plurality of countermeasure threat.

8. A method for emulating a countermeasure threat, said method comprising:
   maintaining a database having a plurality of countermeasure threats;
   downloading data for at least one of said plurality of countermeasure threats into a computer within a housing;
   launching said housing for underwater operation; and
   transmitting an emulation of at least one of said plurality of countermeasure threats into water through an acoustic transducer.

9. The method of claim 8 further comprising processings said data utilizing one or more digital signal processing integrated circuits.

10. The method of claim 9 further comprising providing a plurality of field programmable gate arrays for reprogramming said digital signal processing circuits.

11. The method of claim 8 further comprising utilizing a receiver hydrophone in said countermeasure threat emulator for receiving acoustic signals produced by an incoming torpedo.

12. The method of claim 11 further comprising identifying said incoming torpedo from said received acoustic signals.

13. The method of claim 12 further comprising utilizing a neural network within said countermeasure threat emulator for said identifying.

14. The method of claim 12 further comprising responding to said incoming threat based on said identification and a preprogrammed response for said identification.

15. The method of claim 14 further comprising simultaneously broadcasting acoustic signals and receiving acoustic signals.

\* \* \* \* \*